Jan. 27, 1942.  F. B. CONLON  2,271,415
REFRIGERATING MEANS FOR VEHICLES
Filed Dec. 2, 1937
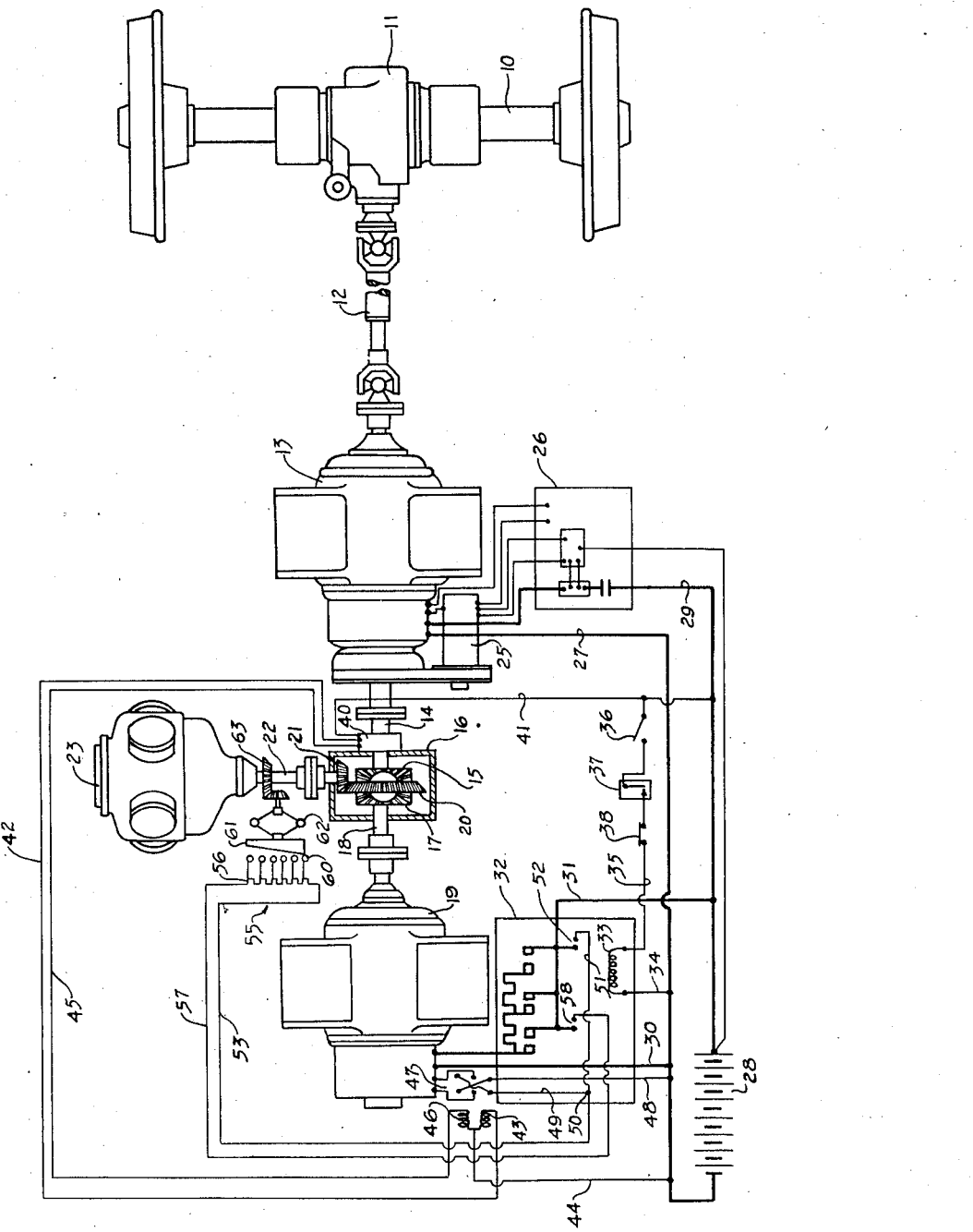
INVENTOR
FRANK B. CONLON
BY
ATTORNEY

Patented Jan. 27, 1942

2,271,415

UNITED STATES PATENT OFFICE 2,271,415

REFRIGERATING MEANS FOR VEHICLES

Frank B. Conlon, Dayton, Ohio, assignor, by mesne assignments, to Chrysler Corporation, Highland Park, Mich., a corporation of Delaware Application December 2, 1937, Serial No. 177,685

6 Claims. (Cl. 62—3)

This invention relates to means for operating a compressor mounted upon a vehicle, such as a railroad car, particularly for use in refrigerating the vehicle, either for air conditioning a passenger car or for cooling commodities in a refrigerator car.

The object of the present invention is to devise a drive for the compressor whereby the compressor may always operate at a constant speed and therefore deliver a substantially constant volume of refrigeration. The apparatus comprises means to drive the compressor by electrical equipment wholly mounted upon the car, or by a mechanical connection to the car axle; with connections between the two driving means such that one is always a factor in determining the speed at which the other operates. In other terms, the compressor is so connected to the electrical drive and mechanical drive as to be continually affected by both. With my device, if a car is standing still, the mechanical drive is still connected to the compressor, but, since the car axle is stationary, the electrical drive is operated at its maximum speed; if the car is moving the electrical drive and mechanical drive both have some effect upon the compressor, the speed of one determining the speed of the other; and if the car is operating at the greatest speed for which the mechanism has been designed, the electrical equipment may be stationary since the mechanical drive is sufficient in itself to operate the compressor at its constant speed.

Specifically, my apparatus comprises a flexible shaft rotated by gearing connected to a car axle, which shaft drives a generator, the opposite end of the rotating part of which is fastened to one of the main gears of a differential gearing mechanism. The electrical drive comprises a shunt-wound D. C. motor fastened beneath the car body in line with the shaft and generator previously described, the armature of the motor being fastened to the opposite main gear of the gear assembly. The pinions and ring gear of the differential gear assembly drive a shaft carrying a bevel gear with which the ring gear meshes, the shaft comprising the crankshaft of a compressor mounted at right angles to the shafts of the generator and motor. With such an assembly, if one of the main gears of the differential is positively held in stationary position, the other main gear must be rotated in order to operate the compressor. If the compressor is to operate at a constant speed, there will be times when one or the other of the main gears will rotate faster or slower than the compressor shaft; there will also be certain times when the main gear connected to the axle and the main gear connected to the motor will rotate at the same speed, which speed will be some function of the speed of the compressor shaft depending upon the gear ratios involved.

In order to control this combination of elements, I have found it expedient to vary the speed of rotation of the motor armature inversely to the speed of rotation of the compressor crankshaft. The speed of rotation of the generator shaft depends entirely upon the speed at which the car is moving and, hence, cannot be controlled. If the car is stationary, the motor will be operated at an efficient constant speed by means of a battery mounted upon the car (or, of course, by means of current derived from the station power lines). As soon as the car starts to move the effect would be to cause an increase in the speed of the compressor crankshaft, a portion of my invention comprising means to sense such increase in speed and to utilize this means to reduce the speed of the motor shaft in proportion to the increase in speed of the axle driven shaft, and vice versa. At a certain car speed the generator will generate sufficient current to overcome the current from the battery, thereby causing the motor to run directly from power derived from the generator, and any excess power may be utilized to charge the battery for such periods of time when the car is proceeding at a slower speed than the critical speed of the generator or when the car is standing still.

The operation of my invention will be more readily apparent from an inspection of the accompanying drawing wherein the numeral 10 represents the axle of a car to which is connected a motion transmitting device 11 such as fully detailed in the patent to Spicer, No. 2,160,445, dated May 30, 1939. The motion of the car axle is transmitted to a flexible, extensible shaft 12 which is in turn connected to the rotating shaft of a D. C. generator 13 mounted beneath the car body. The shaft of generator 13 is in turn connected to a shaft 14 carrying the main gear 15 of a differential gear assembly 16. The opposite main gear 17 is connected to a shaft 18 which is coupled to the shaft of a D. C. motor 19 also mounted beneath the car body in line with the shafts 12 and 14. The differential gear assembly comprises a ring gear 20 carrying the usual pinion gears which mesh with the main gears 15 and 17. The ring gear 20 meshes with a bevel gear 21 borne by a shaft coupled to the crankshaft 22 of the compressor 23. It is obvious that, if the compressor shaft 22 is to rotate, one or the other of the shafts 14 and 18 must rotate, and that in order to maintain the rotation of shaft 22 at a constant speed, both shafts 14 and 18 may rotate at the same speed at one critical point but at all other times one of the shafts is rotating slower or faster than the other, as the case may be.

The generator 13 is preferably a D. C. generator provided with a field exciter 25 and current reversing mechanism schematically indicated at 26. Current created by the generator may flow through wire 27, battery 28 and wire 29 in order to charge the battery whenever sufficient current is generated for such purpose. A wire 30 connected to wire 27 leads to the armature of the D. C. motor 19, and a wire 31 connected to wire 29 leads to the motor armature through a motor starter 32 of any suitable type including a starter relay coil 33. The coil 33 is connected by wire 34 to wire 27 on one side, and by wire 35 to wire 29 on the other side so that the motor starter may be energized and the motor operated either by the battery or by the generator. Wire 35 includes a manual switch 36, a thermostatic switch 37 and any other switches in the control circuit such as a pressure-responsive safety switch 38, which switches must be closed in order to operate the motor to cause the compressor to run.

The D. C. generator 13, being provided with the current reverser 26, may create current regardless of the direction of movement of the car. The direction of movement of the car will be reflected in the direction of rotation of shaft 14 upon which is mounted a reversing switch schematically indicated at 40. The neutral terminal of the reversing switch is connected to wire 29 by wire 41, one directional terminal of the switch 40 is connected to wire 27 by wire 42, reversing relay 43 and common wire 44, and the other directional terminal of switch 40 is connected to wire 27 by wire 45, reversing relay 46 and common wire 44. A field reversing switch 47 is influenced by the reversing switch 40 in order to reverse the direction of field flux in the D. C. motor 19 depending upon the direction of movement of the car. The field reversing switch 47 is connected at one side to wire 27 by wire 48 and at the other side is connected by means of a wire 49 to a terminal point 50. From the terminal point 50 a wire 51 leads to a contact 52 which is connected to wire 31 when the motor starter is placed in operation by the starting relay. The terminal 50 is also connected by means of a wire 53 with a field regulating device indicated at 55, which includes a non-inductive resistance coil 56. The opposite end of coil 56 is connected by means of wire 57 to a contact 58 which is connected to wire 31 when the motor starter is placed in operation by the motor relay. As schematically indicated contact 52 places wires 51 and 31 in connection when the greatest resistance is across the motor armature. As soon as the motor starter has operated and the starting resistance has been removed from the circuit, contact 52 places wires 49 and 31 in connection so that the coil 56 is carrying current as long as the motor operates. The coil 56 is provided with a plurality of dividing contacts 60 which may be shorted by a bar 61, the bar being provided with a beveled edge so that the contacts 60 are engaged one by one. Bar 61 is movable by a speed-responsive device such as a centrifugal weight mechanism 62 which is operated by beveled gearing including a bevel gear 63 mounted upon shaft 22 of the compressor 23. By means of the foregoing mechanism the speed of the shaft 18, driven by D. C. motor 19, may be reduced or increased inversely to any reduction or increase in the speed of the compressor shaft 22. An increase in speed of the shaft 22 causes the centrifugal device to move the bar 61 away from contacts 60 thereby decreasing the field current of the motor 19 and, hence, causing a reduction in speed of the shaft 18. A decrease in speed of shaft 22 causes the bar 61 successively to engage the contacts 60 thereby causing a gradual increase in field current and a corresponding increase in the speed of shaft 18.

The operation of the mechanism may be described as follows: When the car is standing still, shaft 14 will be stationary. If the manual switch 36 is closed and the refrigeration system is in order so that the safety switch is closed and the thermostat 37 is influenced by the temperature of the car so as to make contact, the motor starter will be operated and the motor 19 will derive current from the battery 28 to rotate shaft 18 at a certain speed. This causes ring gear 20 to revolve and drive the compressor shaft 22 at a desired constant speed. If the car begins to move, shaft 14 will revolve with the result that ring gear 20 and shaft 22 increase in speed thereby causing bar 61 successively to engage contacts 60, thereby decreasing the speed of shaft 18. At a certain point the shafts 14 and 18 will be revolving at the same speed; thereafter, as the car increases in speed, shaft 18 will revolve at a lesser speed than shaft 14, conceivably decreasing in speed until a stationary point is reached.

If the car is stationary and no refrigeration is demanded, none of the mechanisms will be in motion. If at this time there is no demand for refrigeration and the car starts to move, the motor will not be supplied with current and the motor armature will constitute a mere mass acting as a drag on the differential gearing. No refrigeration is desired, hence, the compressor should not operate and will not operate since the torque applied to shaft 22 by compression within the cylinders is always greater than the torque on shaft 18 due to inertia of the motor armature. A brake may be incorporated so as positively to hold the compressor shaft 22 as long as refrigeration is not desired. After a certain critical speed is reached, the generator 13 may charge the battery, the usual voltage regulator (not shown) being provided in order to prevent over-charging. If refrigeration is now required, the motor will start in the direction indicated by the directional switch 40, the motor drawing current from the battery or from the generator according to the E. M. F. output of either.

If the motor is operating in one direction and the car starts to move in a direction such that the motor should operate in the opposite direction, the field of the motor will be reversed by the reversing switch 47, the field first acting as a brake to stop the motor armature and then acting as a driving force to rotate the motor armature in the opposite direction.

It should be apparent to those skilled in the art that the invention may be applied in other manners, for example, the shaft 14 may be any variably rotating shaft such as the propeller shaft of an automobile or boat, or a shaft driven by a stationary engine or a windmill.

Having described a preferred embodiment of my invention, it should be obvious to those skilled in the art that modification in arrangement and detail thereof may be made without departing from the spirit of the invention as expressed in the following claims.

I claim:

1. The combination of a vehicle, a refrigerant compressor carried thereby, and means for operating said refrigerant compressor comprising a shaft connected to an axle of the vehicle so as to be driven thereby at a variable speed during movement of the vehicle, a generator mounted on said shaft and operated thereby to generate power when the shaft is rotating at or above the generative speed, an electric motor carried by the vehicle, a second shaft deriving motion from said electric motor, a battery carried by the vehicle, connections from said battery to said generator and to said motor whereby the motor may be driven from the battery during periods when the first shaft is rotating below the generative speed, connections from said generator to said motor whereby the motor may be driven by power created by the generator when said first shaft is rotating above the generative speed, differential mechanism operated by said first and second shafts, and a compressor crank shaft operated by said differential mechanism.

2. The combination of a vehicle, a refrigerant compressor carried by said vehicle, and means for operating said refrigerant compressor comprising a shaft connected to an axle of the vehicle so as to be driven thereby at a variable speed during movement of the vehicle, a generator on said shaft and operated thereby to generate power when the shaft is rotating at or above the generative speed, an electric motor carried by the vehicle, a second shaft deriving motion from said electric motor, a battery carried by the vehicle, connections from said battery to said generator and to said motor whereby the motor may be driven from the battery during periods when the first shaft is rotating below the generative speed, connections from said generator to said motor whereby the motor may be driven by power created by the generator when the first shaft is rotating above the generative speed, differential mechanism operated by said first and second shafts, a compressor crank shaft operated by said differential mechanism, a control circuit for said electric motor including a variable field resistance, and means to vary said field resistance in accordance with changes in the speed of said crank shaft whereby to vary the speed of the motor and hence keep the speed of the crank shaft substantially constant in spite of variations in speed of the vehicle.

3. The combination of a vehicle, a refrigerant compressor carried by said vehicle, and means for operating said refrigerant compressor comprising a shaft rotating at a variable speed in accordance with variances in the speed of the vehicle, a second shaft and electromotive means for rotating said second shaft, differential gearing driven by said shafts, a compressor crank shaft driven by said gearing, and means responsive to the speed of the crank shaft to vary the speed of said electromotive means whereby to maintain the speed of the crank shaft substantially constant in spite of variances in the speed of the vehicle.

4. The combination of a vehicle, a refrigerant compressor carried by said vehicle, and means for operating said refrigerant compressor comprising a shaft connected to an axle of the vehicle so as to be rotated thereby at a variable speed during movement of the vehicle, a generator on said shaft and operated thereby to generate power when the shaft is rotating at or above the generative speed, an electric motor carried by the vehicle and deriving energy from power created by said generator, a second shaft deriving motion from said electric motor, differential gearing comprising a main gear connected to said first shaft, a main gear connected to said second shaft and a ring and pinion gear assembly driven by said main gears at a speed determined by the resultant of the speeds of the main gears, a driven gear rotated by said ring and pinion gear assembly, a compressor crank shaft connected to said driven gear, a contact bar movably carried by said vehicle, means responsive to the speed of said compressor crank shaft to operate said contact bar, and a control circuit for said electric motor including a step resistance variably affected by said contact bar shorting steps thereof when moved by said speed responsive means so as to decrease the speed of said motor in response to an increase in speed of said crank shaft, or vice versa, so as to maintain said crank shaft at a constant speed in spite of variations in speed of the vehicle.

5. The improvement in the art of air conditioning comprising the combination of a railway vehicle, and a refrigerating system carried thereby, said system including a mechanical compressor carried by the vehicle, a first compressor driving mechanism including an axle of the vehicle, a second compressor driving mechanism including an electromotive device having an armature shaft, a battery carried by the vehicle and a circuit connecting said battery and said electromotive device for driving said armature shaft, a differential mechanism connected to said axle and to said armature shaft, and a power shaft driven by said differential mechanism and connected to said compressor.

6. The improvement in the art of air conditioning comprising the combination of a railway vehicle, and a refrigerating system carried thereby, said system including a mechanical compressor carried by the vehicle, a first compressor driving mechanism including an axle of the vehicle, a second compressor driving mechanism including an electromotive device having an armature shaft, a battery carried by the vehicle and a circuit connecting said battery and said electromotive device for driving said armature shaft, a differential mechanism connected to said axle and to said armature shaft, a power shaft driven by said differential mechanism and connected to said compressor, and means responsive to variations in speed of said power shaft to vary the speed of said electromotive means inversely whereby to maintain the speed of said power shaft substantially constant in spite of variations in the speed of rotation of said axle.

FRANK B. CONLON.